March 11, 1930.          H. CAREW                1,750,568
                         DISH HOLDER
                      Filed Jan. 6, 1930        2 Sheets-Sheet 2
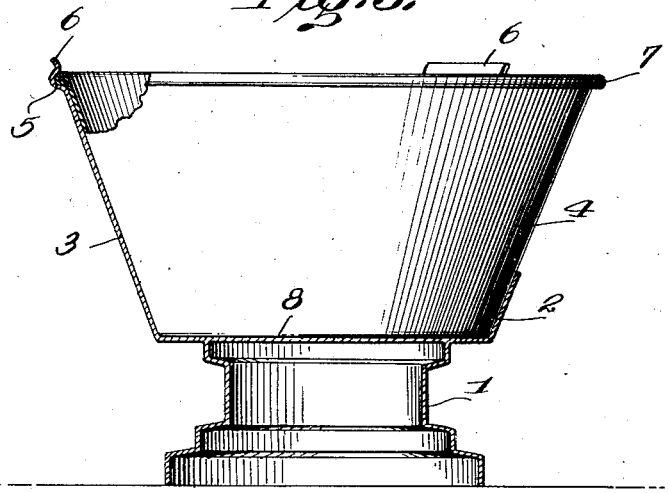
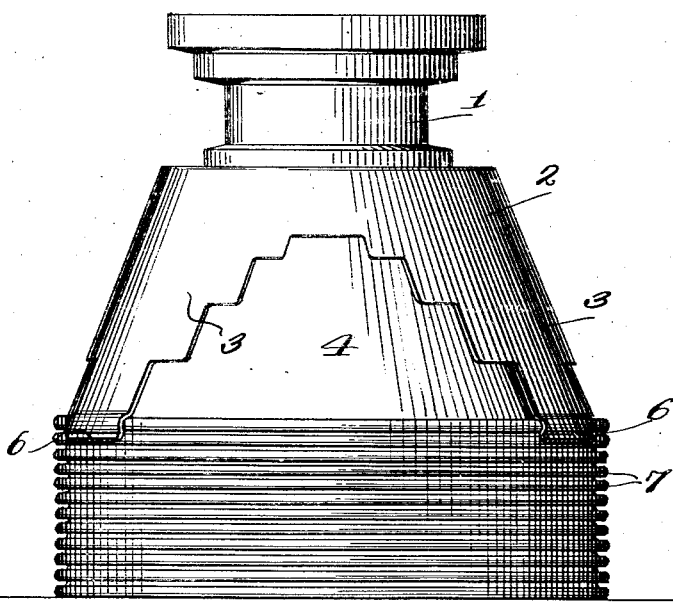
Inventor
Herman Carew
By Milans & Milans
Attorneys Patented Mar. 11, 1930

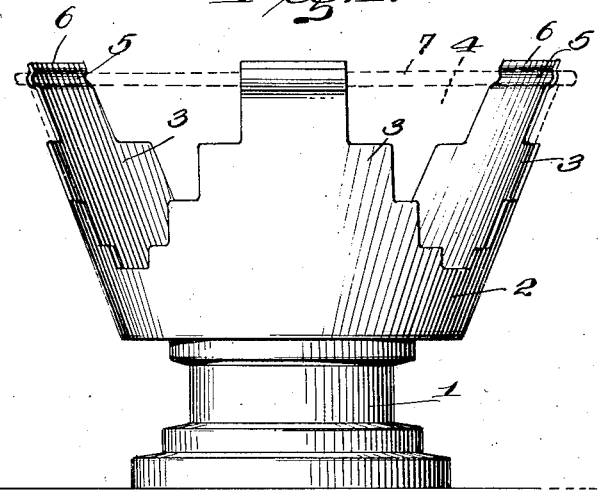
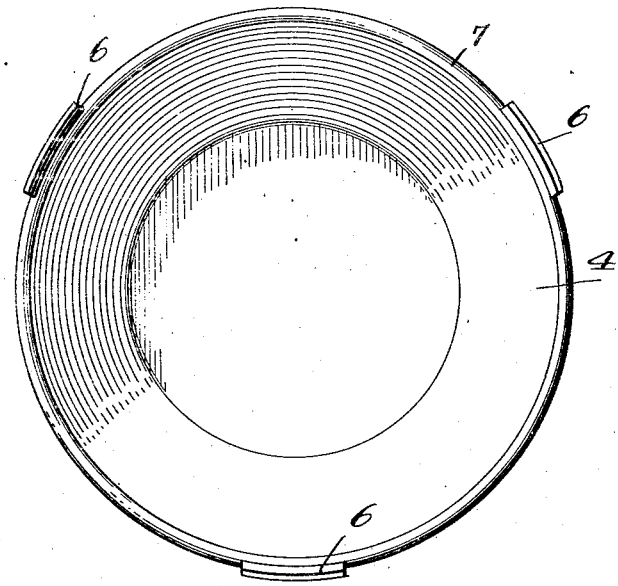

1,750,568

UNITED STATES PATENT OFFICE

HERMAN CAREW, OF EASTON, PENNSYLVANIA, ASSIGNOR TO INDIVIDUAL DRINKING CUP COMPANY, INC., OF EASTON, PENNSYLVANIA, A CORPORATION OF PENNSYLVANIA

DISH HOLDER

Application filed January 6, 1930. Serial No. 418,811.

My invention relates to new and useful improvements in dish holders and more particularly to a device for holding a paper dish which is formed and adapted for but a single use. Paper dishes are extensively in use at soda fountains, lunch counters, and similar places and they are usually made of relatively thin flexible material so that they may be easily destroyed and thrown away after a single use. In view of the material used and the flexibility thereof it can readily be appreciated that it is desirable to use some form of holder or support while the dish is in use to prevent destruction of the dish at that time or the possibility of injuring the same so that it will leak. It is the principal object of my invention to provide a holder of the character described which is relatively simple and inexpensive in construction, which may be readily cleaned, and which will hold the dish in its original configuration without possibility of damage during use.

Another object of the invention resides in so forming the holder that it may be used for removing a single dish from a stack and with said dish in position the dish may be readily filled and the contents eaten.

Still another object of the invention consists in so forming the holder that the dish will not rotate therein and will not have vertical movement relative to the holder while in use. At the same time after use the dish may be readily removed and mutilated and thrown away so that it will not be used again.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is an elevation of the holder with a dish shown in dotted lines.

Fig. 2 is a top plan of the holder showing a dish in position for use.

Fig. 3 is a transverse vertical section through the holder with a dish shown in elevation with parts broken away; and Fig. 4 is a side elevation showing a stack of nested dishes with the holder in inverted position for removing the uppermost dish from the stack for use.

The holder will preferably be made of relatively light metal and consists of the base portion 1 and body portion 2 having the upwardly extending arms 3. The body portion and upwardly extending arms 3 thereof are of tapered formation or in other words flare outwardly from the bottom towards the top so that the holder will be of increasing diameter from the bottom towards the top to snugly engage the outer tapered wall of the dish 4, as shown more particularly in Fig. 3 of the drawings. While I have shown the holder of tapered formation used in connection with a dish of similar construction it will be understood that, if desired, the walls of the holder, including the arms 3, might be straight to accommodate a straight walled dish. Adjacent the upper ends the arms 3 are provided, interiorly, with the circumferentially extending grooves 5 and the ends of the arms above the grooves are preferably flared outwardly as shown at 6 for a purpose which will later be apparent.

The dish 4 is provided at its upper end or edge with an outwardly directed bead 7. In order to make the holder relatively light the base 1 will preferably be hollow, as shown more particularly in Fig. 3 of the drawings and the body portion will have the flat bottom 8 upon which the bottom of the dish will rest as also quite clearly shown in Fig. 3.

In Fig. 4 I have shown a stack of nested dishes with their open ends faced downwardly so as to prevent impurities entering the dishes and also to facilitate handling and removal for positioning in the holder. When in nested form as shown in Fig. 4 the outwardly extending beads or flanges 7 will be positioned in close proximity but spaced sufficiently apart to allow removal of one at a time. It will be appreciated that in using dishes of the character described that it is desired to maintain the dishes in sanitary form at all times with the least possible contact with the hands. In the use of a holder such as I have provided, when it is desired to use, the holder may be inverted as shown more particularly in Fig. 4 and the base portion 1 will be used as a hand grip. The holder will then be moved downwardly over the uppermost dish of the stack and the flared ends 6 of the arms will ride over the bead of the uppermost dish and allow the bead to be received in the circumferentially extending grooves 5 of the arms. The beaded edge of the dish will flex sufficiently to allow the bead to pass into the grooves and with the dish in position the frictional engagement of the dish with the arms is sufficient to prevent rotation of the dish within the holder, during use, and the bead being received in the grooves there will be no vertical movement of the dish in the holder. The bottom of the dish rests upon the bottom 8 of the holder which forms a support therefor and the arms 3 are of sufficient width as to form relatively wide bearing surfaces around the diameter of the dish to properly support the side wall of the dish during use. After the contents have been removed from the dish the same may be flexed sufficiently for removal from the holder and thrown away. From the above it will be seen that I have provided a novel form of holder which may be used to remove a single dish from a stack of such dishes and with the dish in position within the holder there will be no rotary or vertical movement of the dish relative to the holder. As shown the arms 3 are spaced apart circumferentially of the holder and if found necessary in positioning the dish within the holder the fingers of the user may engage the outer wall of the dish between the arms.

Having fully described my invention what I claim as new and desire to secure by Letters Patent is:

1. A dish holder of the character described including a body portion having upwardly extending arms, each of the arms having a circumferentially extending groove formed in its inner face to receive a bead formed around the upper edge of the dish.

2. A dish holder of the character described including a body portion having upwardly directed arms, the upper end of each of the arms being outwardly flared and a circumferentially extending groove being formed in the inner face of each of the arms below the outwardly flared end.

In testimony whereof I hereunto affix my signature.

HERMAN CAREW.